United States Patent
Otsuka et al.

(10) Patent No.: US 7,559,247 B2
(45) Date of Patent: Jul. 14, 2009

(54) PRESSURE SENSOR WITH REDUCED SIZE STRAIN GAUGE MOUNTING STRUCTURE AND MANUFACTURING METHOD OF THE SAME

(75) Inventors: Kiyoshi Otsuka, Kariya (JP); Osamu Itoh, Anjo (JP); Hiroshi Uchigashima, Nagoya (JP); Kazuhiro Yoshino, Chiryu (JP); Keiji Horiba, Nishikasugai-gun (JP); Tetsuya Ogawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 47 days.

(21) Appl. No.: 11/826,065

(22) Filed: Jul. 12, 2007

(65) Prior Publication Data
US 2008/0047354 A1 Feb. 28, 2008

(30) Foreign Application Priority Data

Jul. 14, 2006 (JP) ............................. 2006-193794
Mar. 26, 2007 (JP) ............................. 2007-079260

(51) Int. Cl.
*G01L 9/04* (2006.01)
(52) U.S. Cl. .............................. 73/726; 73/715; 73/753; 73/754; 361/283.4
(58) Field of Classification Search ........... 73/700–756; 361/283.1–283.4
See application file for complete search history.

(56) References Cited

U.S. PATENT DOCUMENTS

| | | | | |
|---|---|---|---|---|
| 3,830,100 | A * | 8/1974 | Kamer ........................ | 73/769 |
| 4,840,067 | A * | 6/1989 | Nishida et al. ................ | 73/726 |
| 4,986,861 | A | 1/1991 | Nishida et al. | |
| 5,167,158 | A * | 12/1992 | Kamachi et al. .............. | 73/727 |
| 5,289,721 | A * | 3/1994 | Tanizawa et al. .............. | 73/727 |
| 5,581,226 | A | 12/1996 | Shah | |
| 5,637,801 | A * | 6/1997 | Ichihashi ..................... | 73/715 |
| 5,974,893 | A * | 11/1999 | Balcarek et al. ............... | 73/714 |
| 6,028,332 | A * | 2/2000 | Kano et al. .................. | 257/254 |
| 6,289,738 | B1 * | 9/2001 | Zabler et al. .................. | 73/726 |
| 6,453,747 | B1 * | 9/2002 | Weise et al. ................... | 73/715 |
| 6,584,851 | B2 * | 7/2003 | Yamagishi et al. ............ | 73/715 |
| 6,595,065 | B2 * | 7/2003 | Tanizawa et al. .............. | 73/720 |
| 6,615,668 | B2 * | 9/2003 | Toyoda et al. ................. | 73/720 |
| 6,789,431 | B2 | 9/2004 | Ishio | |
| 6,820,487 | B2 * | 11/2004 | Esashi et al. .................. | 73/705 |
| 6,973,836 | B2 * | 12/2005 | Katsumata et al. ............ | 73/754 |
| 6,997,058 | B2 * | 2/2006 | Toyoda ........................ | 73/726 |
| 7,228,745 | B2 * | 6/2007 | Kunda et al. .................. | 73/754 |
| 7,320,250 | B2 * | 1/2008 | Ueno ........................... | 73/754 |
| 2006/0053875 | A1 | 3/2006 | Haussner et al. | |

FOREIGN PATENT DOCUMENTS

JP A-4-267566 9/1992

(Continued)

*Primary Examiner*—Andre J Allen
*Assistant Examiner*—Jermaine Jenkins
(74) *Attorney, Agent, or Firm*—Posz Law Group, PLC

(57) ABSTRACT

A pressure sensor for detecting pressure includes: a metallic diaphragm for receiving the pressure; four strain gauges providing a Wheatstone bridge, wherein each strain gauge outputs an electric signal corresponding to deformation of the diaphragm when the diaphragm is deformed by the pressure; and four semiconductor chips corresponding to four strain gauges, wherein each strain gauge is disposed in the semiconductor chip. Each semiconductor chip is mounted on the diaphragm.

24 Claims, 14 Drawing Sheets

FOREIGN PATENT DOCUMENTS

| | | | |
|---|---|---|---|
| JP | A-5-13782 | 1/1993 |
| JP | 05215504 A * | 8/1993 |
| JP | 09005187 A * | 1/1997 |
| JP | A-11-94673 | 4/1999 |
| JP | A-2000-275128 | 6/2000 |
| JP | 2003023039 A * | 1/2003 |

* cited by examiner

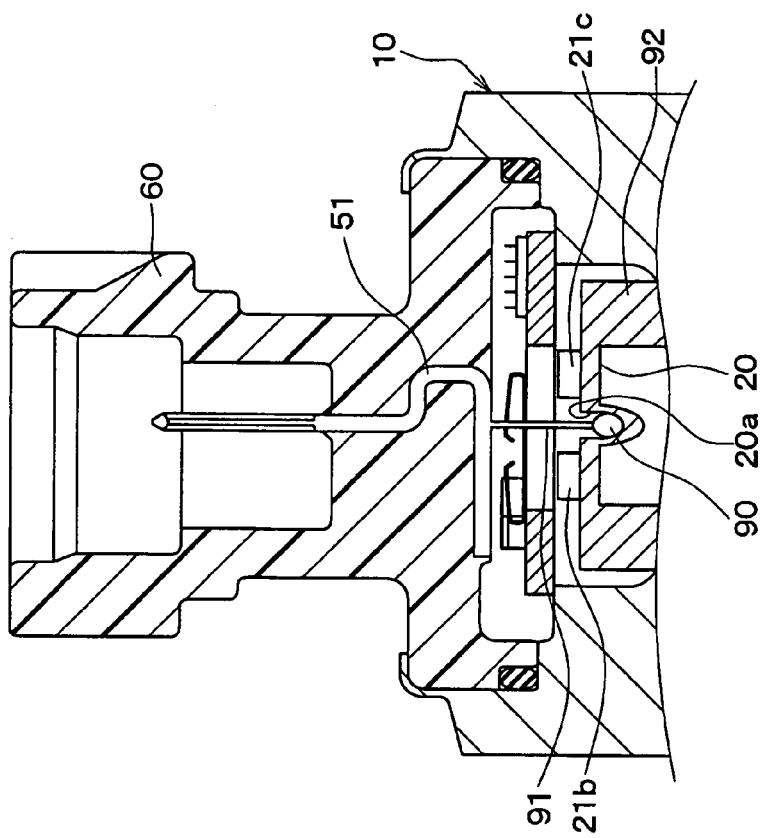
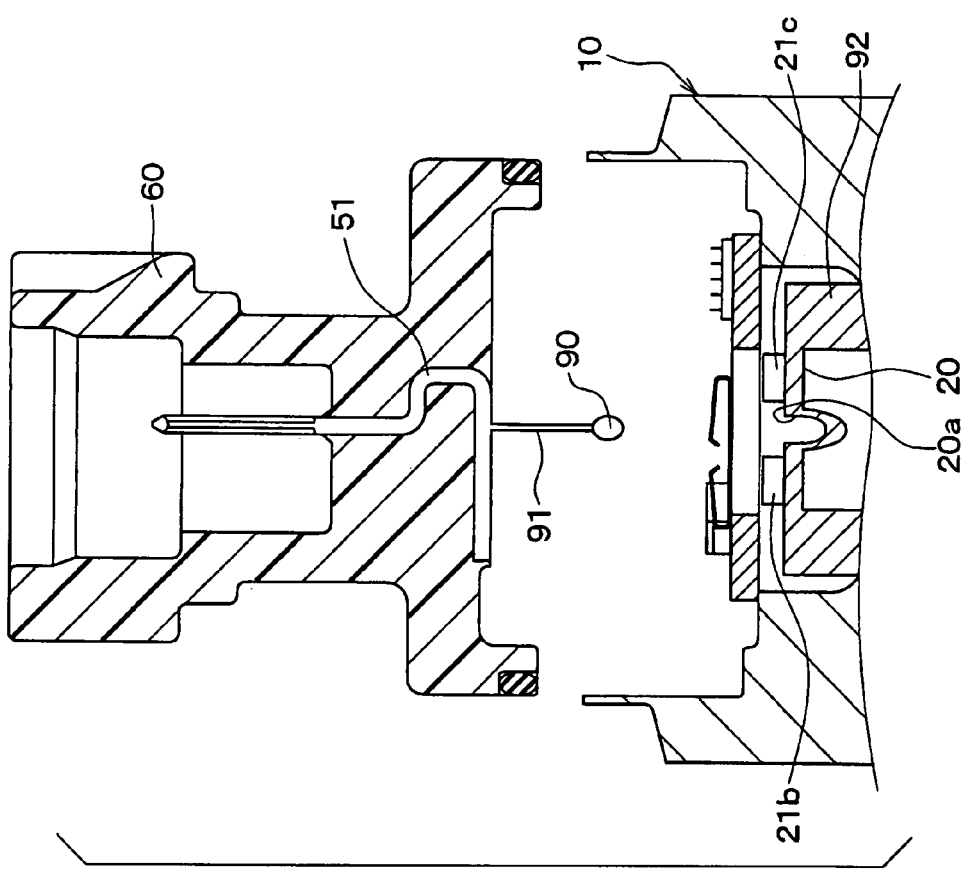

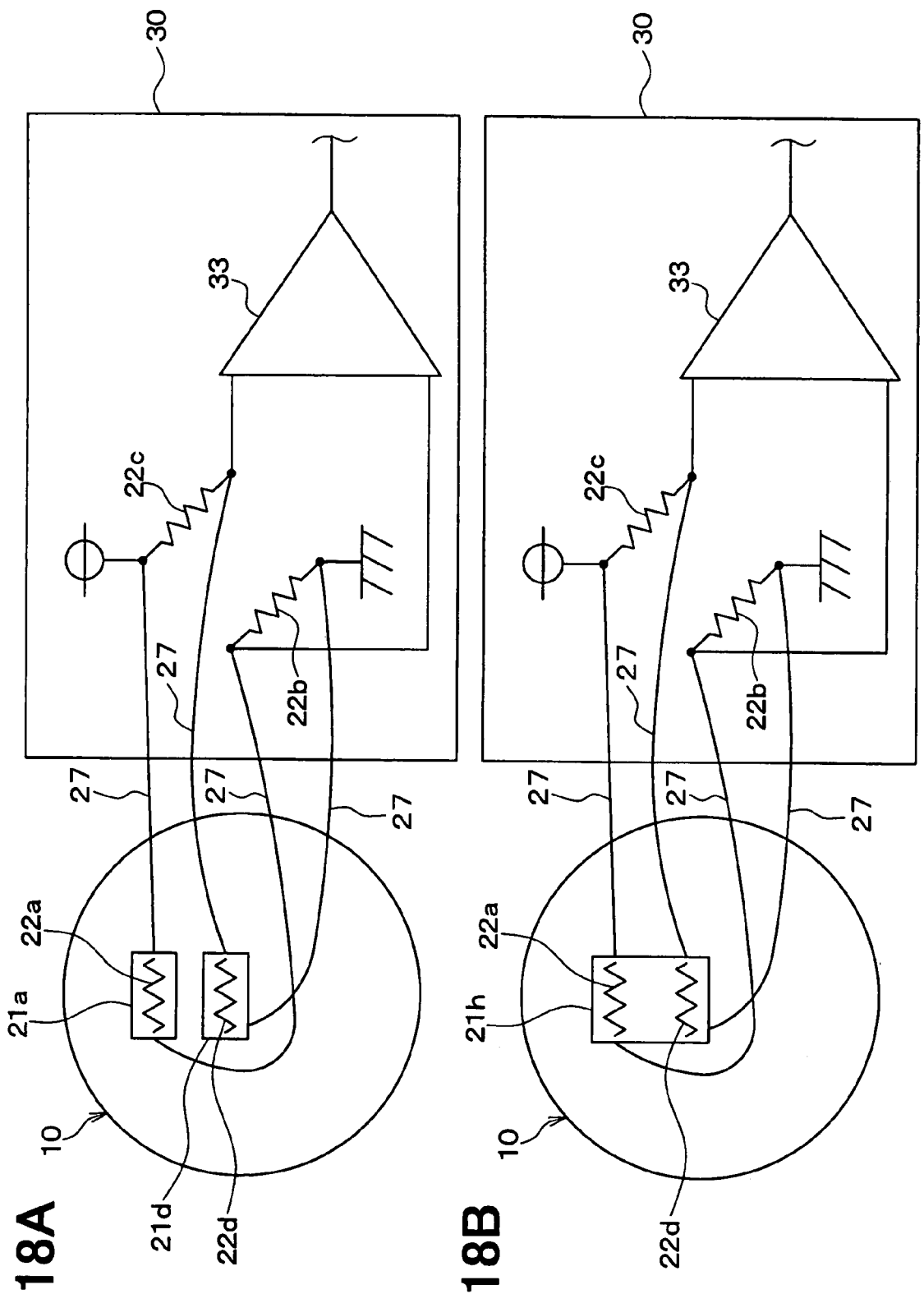

PRESSURE SENSOR WITH REDUCED SIZE STRAIN GAUGE MOUNTING STRUCTURE AND MANUFACTURING METHOD OF THE SAME

CROSS REFERENCE TO RELATED APPLICATIONS

This application is based on Japanese Patent Applications No. 2006-193794 filed on Jul. 14, 2006, and No. 2007-79260 filed on Mar. 26, 2007, the disclosures of which are incorporated herein by reference.

FIELD OF THE INVENTION

The present invention relates to a pressure sensor and a manufacturing method of a pressure sensor.

BACKGROUND OF THE INVENTION

Heretofore, a pressure sensor stated in JP-A-2000-275128 has been proposed as the pressure sensor of the type specified above. The pressure sensor includes a package in which a metallic housing having a pressure introducing port is joined unitarily with a resinous connector case having a terminal pin for exchanging signals with the exterior.

The package includes a detection portion which generates electric signals corresponding to a pressure introduced from the pressure introducing port. The detection portion is configured including strain gauges which are formed by doping a semiconductor chip with, for example, a P-type impurity. Besides, the detection portion is joined through a glass paste (low-melting glass) on the front surface of a metallic diaphragm which is constructed by thinning part of a metallic stem.

With the pressure sensor configured as stated in JP-A-2000-275128, in order to join the semiconductor chip onto the metallic diaphragm, a mounting area corresponding to the size of the semiconductor chip must be secured on the upper surface of the diaphragm. Since the strain gauges numbering four are fabricated in one semiconductor chip, the size of the semiconductor chip is large, and also the mounting area which must be secured for the semiconductor chip becomes large. Therefore, the versatility of a place where the semiconductor chip is joined is low, and it is desired to reduce the size of the semiconductor chip. Thus, it is required for a pressure sensor to reduce the size of the semiconductor chip constructing a strain gauge.

SUMMARY OF THE INVENTION

In view of the above-described problem, it is an object of the present disclosure to provide a pressure sensor. It is another object of the present disclosure to provide a manufacturing method of a pressure sensor.

According to a first aspect of the present disclosure, a pressure sensor for detecting pressure includes: a metallic diaphragm for receiving the pressure; four strain gauges providing a Wheatstone bridge, wherein each strain gauge outputs an electric signal corresponding to deformation of the diaphragm when the diaphragm is deformed by the pressure; and four semiconductor chips corresponding to four strain gauges, wherein each strain gauge is disposed in the semiconductor chip. Each semiconductor chip is mounted on the diaphragm.

In the above case, dimensions of each semiconductor chip are minimized, compared with a case where four gauges are integrally formed in one semiconductor chip. Accordingly, a mounting area of the diaphragm for mounting the four semiconductor chips is minimized, so that a whole size of the sensor is reduced. Further, a designing degree of freedom for mounting the semiconductor chips on the diaphragm is also increased.

According to a second aspect of the present disclosure, a pressure sensor for detecting pressure includes: a metallic diaphragm for receiving the pressure; four strain gauges providing a Wheatstone bridge, wherein each strain gauge outputs an electric signal corresponding to deformation of the diaphragm when the diaphragm is deformed by the pressure; a semiconductor chip, wherein a part of the four strain gauges is disposed in the semiconductor chip; and a substrate having a signal processor for processing the electric signals outputted from the four strain gauges, wherein a rest part of the four strain gauges is disposed in the substrate. Only the semiconductor chip is mounted on the diaphragm.

In the above case, since the semiconductor chip on which the part of the four strain gauges is mounted is formed on the diaphragm, a mounting area of the semiconductor chip is sufficiently reduced. Thus, a whole size of the sensor is reduced, and further, a designing degree of freedom for mounting the semiconductor chips on the diaphragm is also increased.

According to a third aspect of the present disclosure, a pressure sensor for detecting pressure includes: a metallic diaphragm for receiving the pressure; four strain gauges providing a Wheatstone bridge, wherein each strain gauge outputs an electric signal corresponding to deformation of the diaphragm when the diaphragm is deformed by the pressure; a first semiconductor chip, wherein two of the four strain gauges are disposed in the first semiconductor chip; and a second semiconductor chip, wherein other two of the four strain gauges are disposed in the second semiconductor chip. The first and second semiconductor chips are mounted on the diaphragm.

In the above, a total mounting area of the first and second semiconductor chips is sufficiently reduced. Thus, a whole size of the sensor is reduced, and further, a designing degree of freedom for mounting the semiconductor chips on the diaphragm is also increased.

According to a fourth aspect of the present disclosure, a pressure sensor for detecting pressure includes: a metallic diaphragm for receiving the pressure; four strain gauges providing a Wheatstone bridge, wherein each strain gauge outputs an electric signal corresponding to deformation of the diaphragm when the diaphragm is deformed by the pressure; a first semiconductor chip, wherein one of the four strain gauges is disposed in the first semiconductor chip; and a second semiconductor chip, wherein other three of the four strain gauges are disposed in the second semiconductor chip. The first and second semiconductor chips are mounted on the diaphragm.

In the above, a total mounting area of the first and second semiconductor chips is sufficiently reduced. Thus, a whole size of the sensor is reduced, and further, a designing degree of freedom for mounting the semiconductor chips on the diaphragm is also increased.

According to a fifth aspect of the present disclosure, a pressure sensor for detecting pressure includes: a metallic diaphragm for receiving the pressure; four strain gauges providing a Wheatstone bridge, wherein each strain gauge outputs an electric signal corresponding to deformation of the diaphragm when the diaphragm is deformed by the pressure; a first semiconductor chip, wherein two of the four strain gauges is disposed in the first semiconductor chip; a second semiconductor chip, wherein another one of the four strain gauges is disposed in the second semiconductor chip; and a third semiconductor chip, wherein a last one of the four strain gauges is disposed in the third semiconductor chip. The first to third semiconductor chips are mounted on the diaphragm.

In the above, a total mounting area of the first to third semiconductor chips is sufficiently reduced. Thus, a whole size of the sensor is reduced, and further, a designing degree of freedom for mounting the semiconductor chips on the diaphragm is also increased.

According to a sixth aspect of the present disclosure, a method for manufacturing a pressure sensor shown in the first aspect includes: arranging each semiconductor chip on a periphery portion of the diaphragm, which has a disk shape; adjusting a sensor sensitivity of each semiconductor chip by sliding the semiconductor chip along with a radial direction of the diaphragm; and bonding each semiconductor chip on the diaphragm after the adjusting.

The above method provides to adjust the sensor sensitivity of the sensor preferably.

BRIEF DESCRIPTION OF THE DRAWINGS

The above and other objects, features and advantages of the present invention will become more apparent from the following detailed description made with reference to the accompanying drawings. In the drawings:

FIGS. 15A and 15B are cross sectional views showing a method for assembling the sensor shown in FIG. 14;

FIGS. 18A and 18B area schematic views showing pressure sensors according to other embodiments;

DETAILED DESCRIPTION OF THE PREFERRED EMBODIMENTS

First Embodiment

Figure 1:
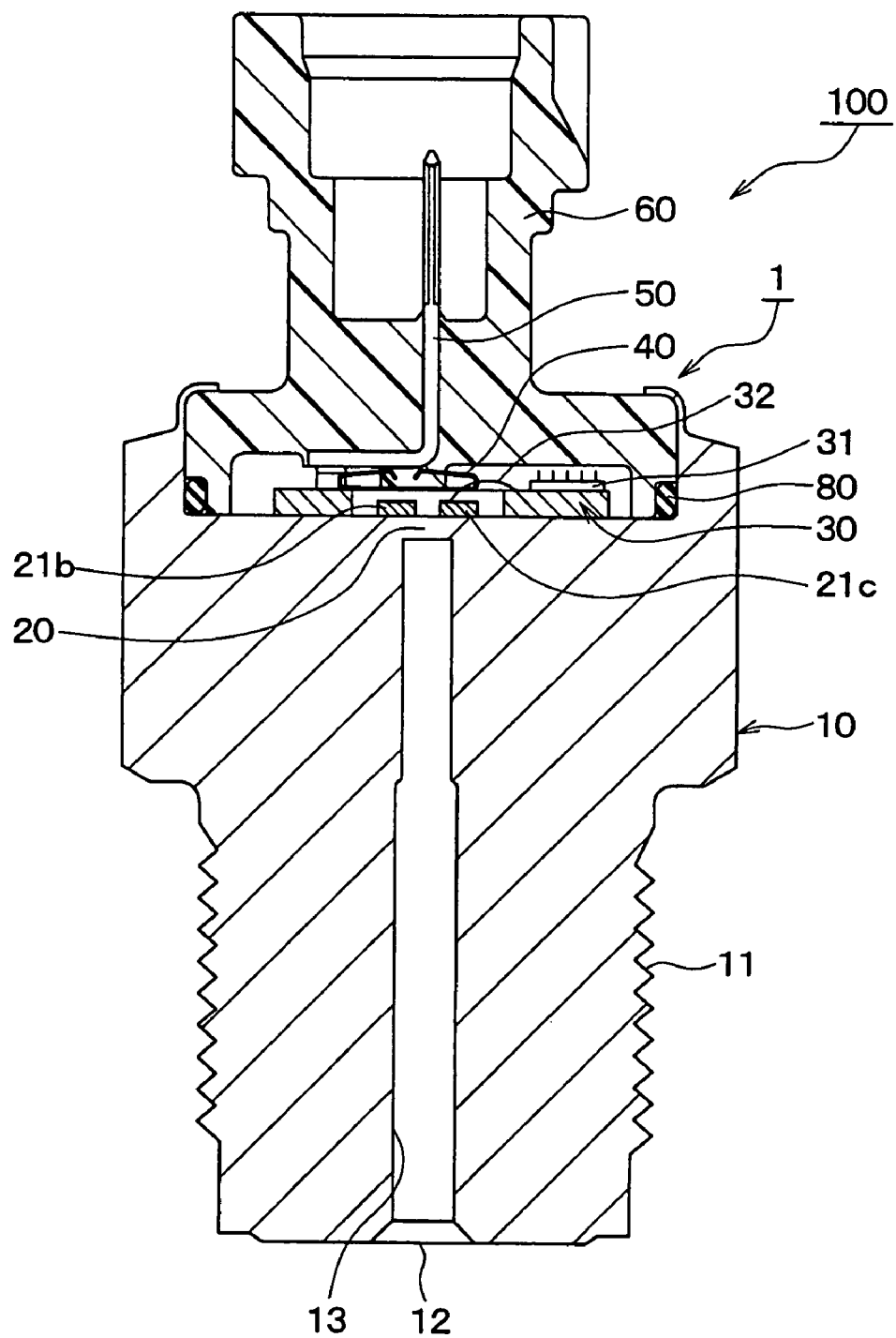
FIG. 1 is a cross sectional view showing a pressure sensor according to a first embodiment.
Figure 2A:
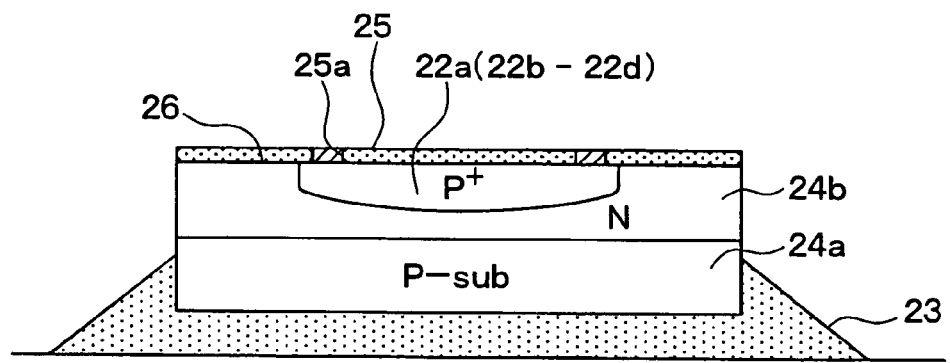
FIG. 2A is a partially enlarged cross sectional view showing the sensor.
Figure 2B:
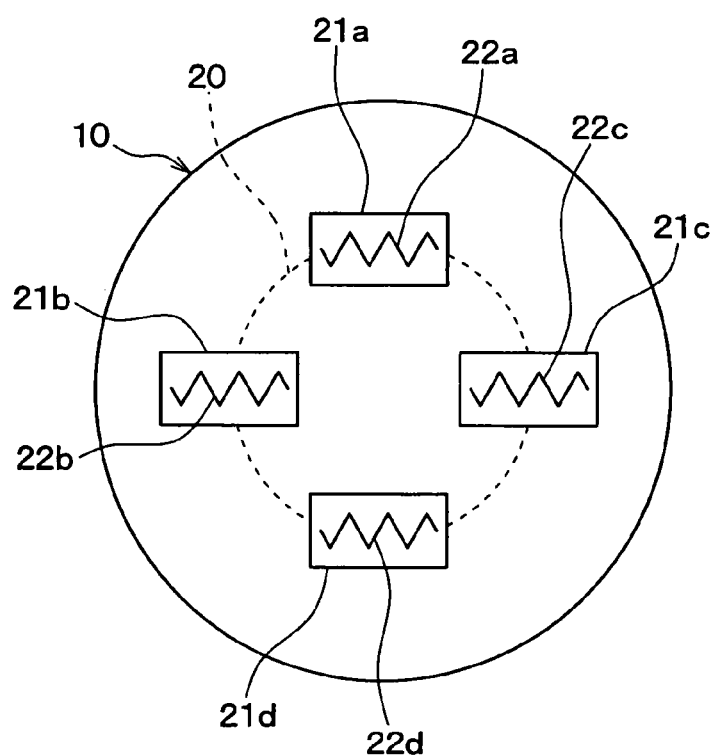
FIG. 2B is a plan view showing a part of the sensor shown in FIG. 2A.

The first embodiment will be described. FIG. 1 is a view showing the schematic sectional configuration of the whole pressure sensor of this embodiment. Besides, FIG. 2A is an enlarged view of a part in FIG. 1, while FIG. 2B is a model diagram showing the top layout of the detection portion of the pressure sensor.

As shown in FIG. 1, a package 1 is so configured that a metallic housing 10 and a resinous connector case 60 having a terminal pin 50 are unitarily joined.

The housing 10 is a metallic hollow cylinder member, and a screw portion 11 which is threadably engageable with an object to-be-measured is formed at the outer peripheral surface of the housing 10 on one end side thereof. A pressure introducing port 13 for introducing an external pressure into the pressure sensor 100 through an opening 12 is formed so as to extend along the center axis of the housing 10 from one end side of this housing 10.

Besides, the housing 10 is thinned at its part corresponding to the front end position of the pressure introducing port 13, and a diaphragm 20 which is deformable by the pressure is constructed of the thinned part. In addition, the pressure of the object to-be-measured is transmitted from the opening 12 to the diaphragm 20 through the pressure introducing port 13.

At the position of the diaphragm 20 within the front surface of one end side of the housing 10, semiconductor chips 21a-21d constituting the detection portion, which output electric signals corresponding to the deformation of the diaphragm 20 are disposed as shown in FIGS. 2A and 2B. In addition, the semiconductor chips 21a-21d are joined to the front surface of one end side of the housing 10 through corresponding members 23 made of a low-melting glass.

The semiconductor chips 21a-21d are formed by employing, for example, silicon substrates, and they are quartered in this embodiment. The quartered semiconductor chips 21a-21d include strain gauges 22a-22d, respectively. The size of each of the semiconductor chips 21a-21d (the size in height× width) is on the order of 0.3-1.5 mm, for example, 1.0 mm in height×1.5 mm in width. The size depends upon the area of each of the strain gauges 22a-22d which are formed on the respective semiconductor chips 21a-21d. In a case where the four strain gauges are all formed on one semiconductor chip as in the prior art, the size of the semiconductor chip becomes, for example, about 3.5 mm×3.5 mm. In this embodiment, therefore, the size of each of the semiconductor chips 21a-21d is sharply reduced.

As shown in FIG. 2A, each of the strain gauges 22a-22d is formed in such a way that an N-type epitaxial layer 24b is formed on the front surface of a silicon substrate 24a of P-type, and that the front surface layer part of the N-type epitaxial layer 24b is doped with a P-type impurity. An insulating film 25 or the like is arranged on the front surfaces of the N-type epitaxial layer 24b and the corresponding one of the strain gauges 22a-22d, and contact holes 25a are formed in those parts of the insulating film 25 which lie at both the ends of the corresponding one of the strain gauges 22a-22d. Pads 26 are disposed so as to be exposed from the contact holes 25a, and the individual pads 26 are electrically connected through bonding wires 27, whereby the strain gauges 22a-22d are electrically connected in the shape of a Wheatstone bridge. Concretely, the strain gauges 22a and 22b are connected in series with each other, while the strain gauges 22c and 22d are connected in series with each other, and the strain gauges 22a and 22b and those 22c and 22d are connected in parallel. In addition, a drive voltage is applied between the strain gauges 22a and 22c, and the position between the strain gauges 22b and 22c is connected to ground (GND).

In addition, the pressure detection is performed by employing, for example, both the mid-point potentials of the strain gauges 22a-22d configured in the shape of the Wheatstone bridge (that is, the potential between the strain gauges 22a and 22b and the potential between the strain gauges 22c and 22d), as outputs. More specifically, when the diaphragm 20 is deformed by the pressure introduced from the pressure introducing port 13 onto the diaphragm 20, the strain gauges 22a-22d disposed in the shape of the Wheatstone bridge on the diaphragm 20 are deformed accordingly. On this occasion, the resistance values of the strain gauges 22a-22d change owing to a piezo-resistance effect based on the deformations, and the mid-point potentials change. Accordingly, the voltage is applied to the strain gauges 22a-22d, and the electric signals corresponding to the changes of the resistance values are outputted from the strain gauges 22a-22d, whereby stresses exerted on the strain gauges 22a-22d, that is, the pressure exerted from the opening 12 of the housing 10 onto the diaphragm 20 through the pressure introducing port 13 can be detected. Therefore, the semiconductor chips 21a-21d formed with the respective strain gauges 22a-22d function as the detection portion.

Figure 3:
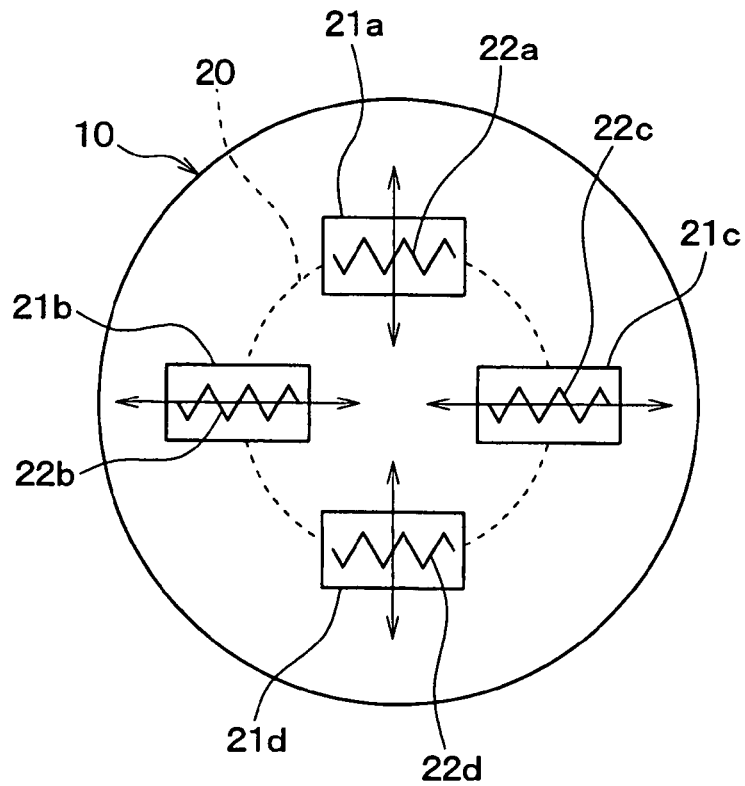
FIG. 3 is a plan view explaining a method for adjusting sensitivity of the sensor.

The detection portion can have its sensitivities adjusted in such a way that, as indicated by arrows in a layout diagram shown in FIG. 3, the individual semiconductor chips 21a-21d are moved vertically or horizontally in the figure. Concretely, regarding the semiconductor chips 21a and 21d, their longitudinal direction, for example, is located in parallel with the tangential direction of the outer circumference of the diaphragm 20, and these semiconductor chips are moved in the radial direction of the diaphragm 20, whereby their sensitivities can be adjusted. Besides, regarding the semiconductor chips 21b and 21c, their longitudinal direction, for example, is located perpendicularly to the tangential direction of the outer circumference of the diaphragm 20, and these semiconductor chips are moved in the radial direction of the diaphragm 20, whereby their sensitivities can be adjusted.

A manufacturing process for the pressure sensor 100 includes the step of sticking the individual semiconductor chips 21a-21d onto the front surface of the diaphragm 20. The above adjustments of the sensitivities are made during the step, whereby the pressure sensor 100 of desired sensitivities can be precisely manufactured.

Besides, a substrate 30 is also arranged on the front surface of one end side of the housing 10. The substrate 30 receives the electric signals (the intermediate potentials of the strain gauges 22a-22d) outputted from the semiconductor chips 21a-21d, and it creates an output signal corresponding to the electric signals. Concretely, the substrate 30 includes an IC chip 31 which has a signal conversion function or the like, or a signal processing circuit, a wiring pattern or the like which processes the electric signals outputted from the semiconductor chips 21a-21d and which generates the signals corresponding thereto.

The semiconductor chips 21a-21d and the substrate 30 are joined by bonding wires 32, thereby to be electrically connected. Thus, the signals of the semiconductor chips 21a-21d are inputted to a circuit and the IC chip 31 arranged on the substrate 30.

Besides, a spring terminal 40 being a spring member serves to electrically connect the circuit on the substrate 30 and the terminal pin 50, and it is formed into a spring shape by bending both the sides of one metal plate. The spring terminal 40 is directly bonded to the substrate 30 by using an electrically-conductive adhesive or the like, and the springy parts of the spring terminal 40 are held in abutment on the lower end part of the terminal pin 50, whereby the electrical connection between the substrate 30 and the terminal pin 50 is established.

Here, the terminal pin 50 and the connector case 60 are made unitary by insert molding or the like. In addition, the upper end part of the terminal pin 50 is connected to an external connector or the like, not shown, whereby the terminal pin 50 is electrically connected through a wiring member to an opposite side circuit or the like located outside the pressure sensor 100.

The connector case 60 forms a connector for externally outputting the signal of a pressure value detected by the pressure sensor 100, that is, a so-called "case plug". This connector case 60 is molded of a resin.

In addition, as shown in FIG. 1, in the pressure sensor, the end part of the housing 10 on the other end side thereof (the upper end side in FIG. 1) is clinched and fixed to the stepped part of the connector case 60. Thus, the connector case 60 and the housing 10 are unitarily joined to configure the package 1, whereby the semiconductor chips 21a-21d, the substrate 30, the electrical connection portions, etc. within the package 1 are protected from moisture and mechanical external forces.

Incidentally, an O-ring 80 is interposed between the outer peripheral part of the connector case 60 and the inner peripheral part of the housing 10, whereby the sealing between them is ensured.

The pressure sensor 100 of this embodiment is configured as described above. According to the pressure sensor 100 thus configured, the four gauge resistances 22a-22d as the strain gauges are respectively formed on the quartered semiconductor chips 21a-21d. Therefore, the size of each of the semiconductor chips 21a-21d can be made smaller than in the case where the four gauge resistances are collectively formed on one semiconductor chip as in the prior art. Moreover, when the detection portion is seen as a whole, the total size of all of the four semiconductor chips 21a-21d can be made smaller. Accordingly, in mounting the individual semiconductor chips 21a-21d on the metallic diaphragm 20, the total mounting area which must be secured for the semiconductor chips 21a-21d can be made smaller. Therefore, the versatility of a place for joining the semiconductor chips 21a-21d can be heightened.

Incidentally, two of the semiconductor chips 21a-21d are mounted on the diaphragm 20 so as to undergo compressive stresses, and the remaining two so as to undergo tensile stresses. In this regard, the semiconductor chips 21a-21d may be arranged in any places as long as such stresses are applied in the places. Therefore, the mounting versatility of the semiconductor chips 21a-21d becomes much higher than in the case where the four gauge resistances are collectively formed on one semiconductor chip. Further, the substrate 30 is formed with the signal processing circuit, the wiring pattern or the like as stated before. In this regard, the arrangement place of the substrate 30 and the allowable arrangement area thereof are determined by the mounting places and mounting area of the semiconductor chips 21a-21d. Therefore, owing to the reduction of the size of each of the semiconductor chips 21a-21d, the versatility of the arrangement place of the substrate 30 can be heightened, and also the allowable arrangement area of the substrate 30 can be increased.

Besides, although the semiconductor chips 21a-21d included in the pressure sensor 100 shown in this embodiment differ in size from a conventional semiconductor chip, they are fabricated on the basis of a general semiconductor process. More specifically, strain gauges are respectively formed in the individual chip regions of a silicon wafer, and the chip regions are thereafter subjected to dicing, whereby the plurality of semiconductor chips in each of which one strain gauge is formed can be obtained.

Second Embodiment

Figure 4:
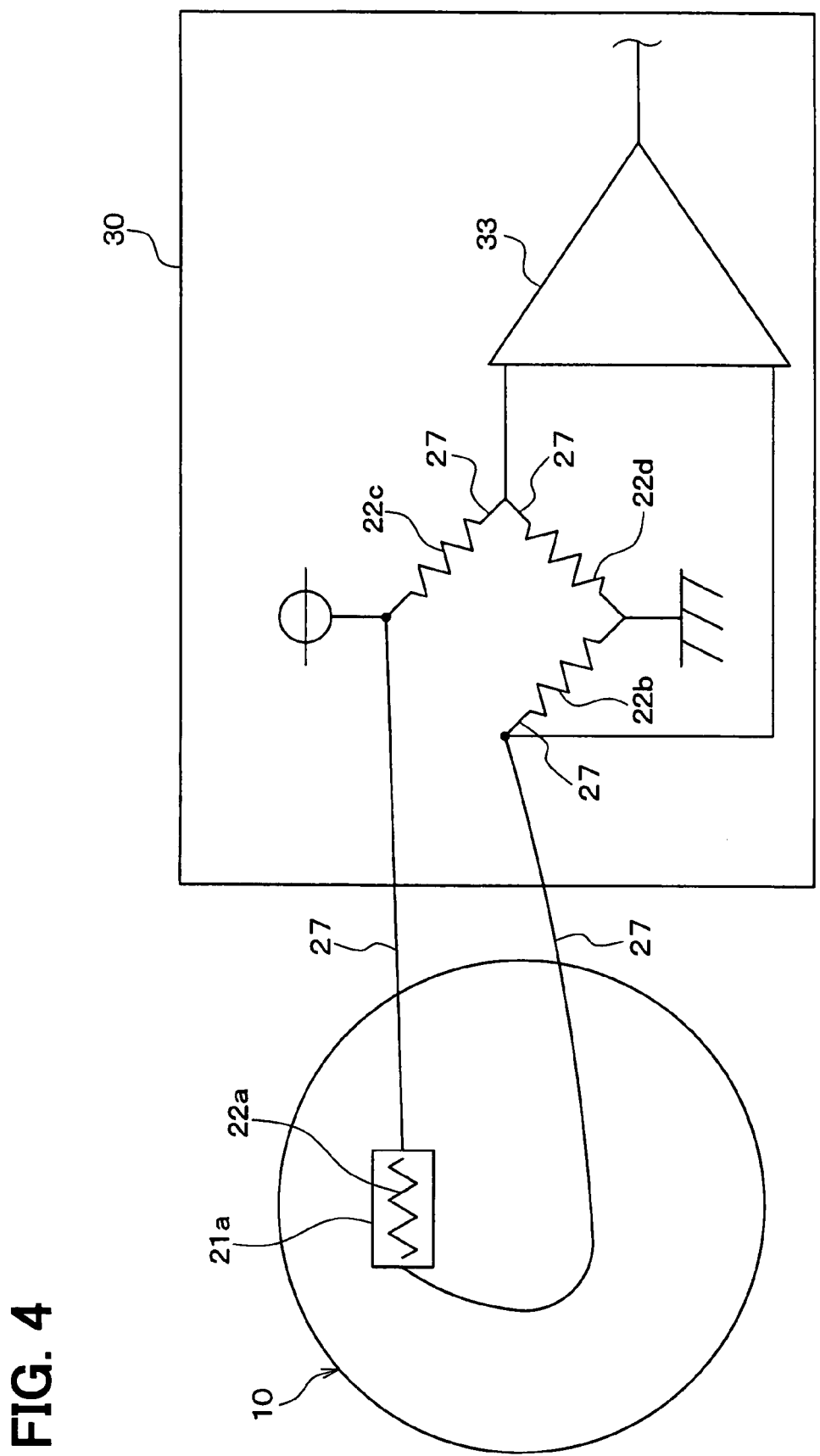
FIG. 4 is a schematic view showing a pressure sensor according to a second embodiment.

The second embodiment will be described. FIG. 4 schematically shows the configuration of a detection portion in the pressure sensor 100 of this embodiment.

As shown in FIG. 4, in this embodiment, only a semiconductor chip 21a formed with a strain gauge 22a is formed on a diaphragm 20, and the other strain gauges 22b-22d are formed within a substrate 30 formed with a signal processing circuit. Incidentally, a differential amplifier 33 in FIG. 4 serves to amplify the potential difference of the mid-point potentials of the strain gauges 22a-22d connected in the shape of a Wheatstone bridge. The differential amplifier 33 is a known one which is generally included in the signal processing circuit of a pressure sensor.

In this manner, only the semiconductor chip 21a is formed with the strain gauge 22a, and it is therefore formed on the diaphragm 20. The other strain gauges 22b-22d can be formed within the substrate 30 including the signal processing circuit, without being formed on the diaphragm 20.

In addition, when only the semiconductor chip 21a is formed on the diaphragm 20 as in the aspect of this embodiment, the mounting area of the semiconductor chip 21a can be made still smaller. Therefore, the versatility of places where semiconductor chips 21a-21d are joined can be heightened more.

Third Embodiment

Figure 5:
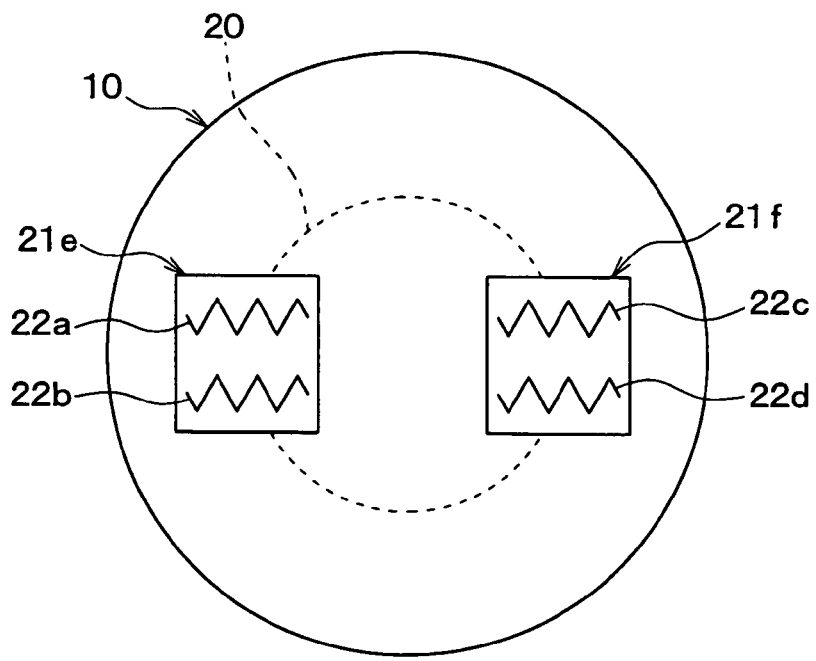
FIG. 5 is a plan view showing a part of a pressure sensor according to a third embodiment.

The third embodiment will be described. FIG. 5 schematically shows the configuration of a detection portion in the pressure sensor 100 of this embodiment.

As shown in FIG. 5, this embodiment is configured including a semiconductor chip 21e which is formed with strain gauges 22a and 22b, and a semiconductor chip 21f which is formed with strain gauges 22c and 22d. That is, two of the strain gauges 22a-22d are arranged on each of the semiconductor chips 21e and 21f. The size of each of the semiconductor chips 21e and 21f having such a configuration (the size in height×width) is on the order of 0.5-1.5 mm, for example, 1.5 mm in height×1.5 mm in width. The size is much smaller than in a case where the four strain gauges are all formed on one semiconductor chip as in a conventional art.

When, in this manner, the two of the strain gauges 22a-22d are arranged on each of the semiconductor chips 21e and 21f, the total mounting area of the semiconductor chips 21e and 21f can be made smaller than in the prior art. Therefore, the versatility of places where semiconductor chips 21e and 21f are joined can be heightened more.

Fourth Embodiment

Figure 6:
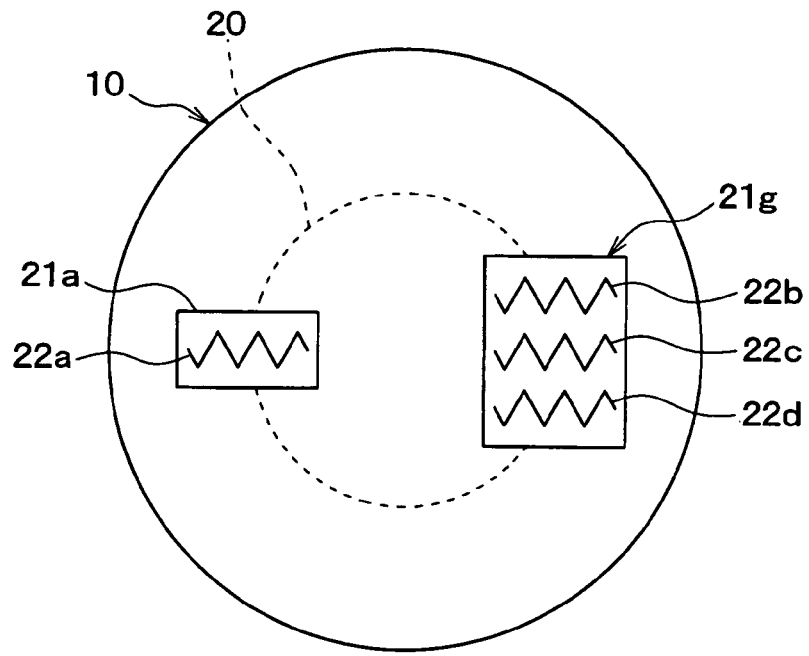
FIG. 6 is a plan view showing a part of a pressure sensor according to a fourth embodiment.

The fourth embodiment will be described. FIG. 6 schematically shows the configuration of a detection portion in the pressure sensor 100 of this embodiment.

As shown in FIG. 6, this embodiment is configured including a semiconductor chip 21a which is formed with a strain gauge 22a, and a semiconductor chip 21g which is formed with strain gauges 22b-22d. That is, one of the strain gauges 22a-22d is formed on the semiconductor chip 21a, and three of the strain gauges 22a-22d are arranged on the semiconductor chip 21g. The size of the semiconductor chip 21g (the size in height×width) is on the order of 1.0-1.5 mm in height and 1.5-2.0 mm in width, and it is made, for example, 1.5 mm×2.0 mm. The size is much smaller than in a case where the four strain gauges are all formed on one semiconductor chip as in the prior art.

When, in this manner, one of the strain gauges 22a-22d is formed on the semiconductor chip 21a, and the remaining three of the strain gauges 22a-22d are arranged on the semiconductor chip 21g, the total mounting area of the semiconductor chips 21a and 21g can be made smaller than in the prior art. Therefore, the versatility of places where the semiconductor chips 21a and 21g are joined can be heightened more.

Fifth Embodiment

Figure 7:
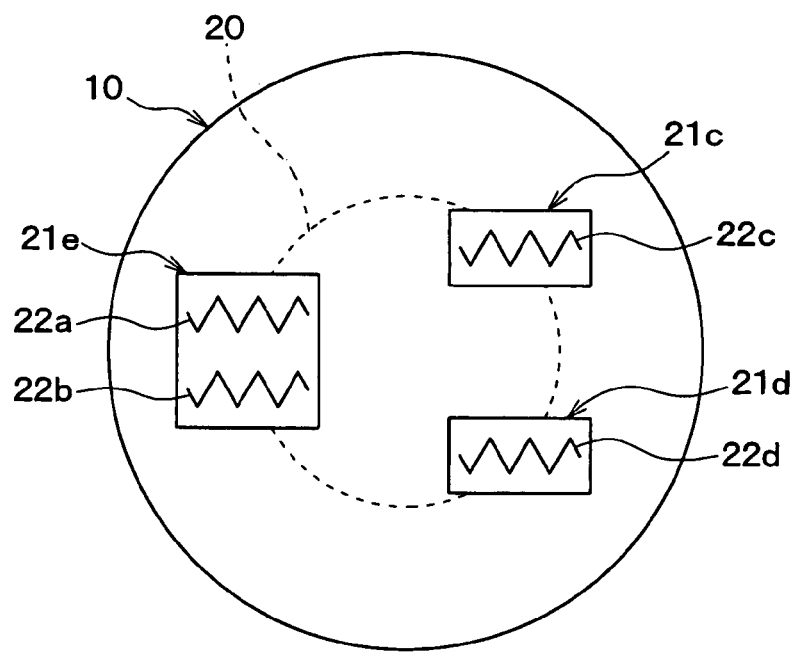
FIG. 7 is a plan view showing a part of a pressure sensor according to a fifth embodiment.

The fifth embodiment will be described. FIG. 7 schematically shows the configuration of a detection portion in the pressure sensor 100 of this embodiment.

As shown in FIG. 7, this embodiment is configured including a semiconductor chip 21e formed with strain gauges 22a and 22b, a semiconductor chip 21c which is formed with a strain gauge 22c, and a semiconductor chip 21d which is formed with a strain gauge 22d. That is, two of the strain gauges 22a-22d are formed on the semiconductor chip 21e, and one of the strain gauges 22a-22d is arranged on each of the semiconductor chips 21c and 21d.

With such a configuration in which two of the strain gauges 22a-22d are formed on the semiconductor chip 21e and in which the remaining one of the strain gauges 22a-22d is arranged on each of the semiconductor chips 21c and 21d, the total mounting area of the semiconductor chips 21e, 21c and 21d can be made smaller than in the prior art. Therefore, the versatility of places where the semiconductor chips 21e, 21c and 21d are joined can be heightened more.

Sixth Embodiment

Figure 8A:
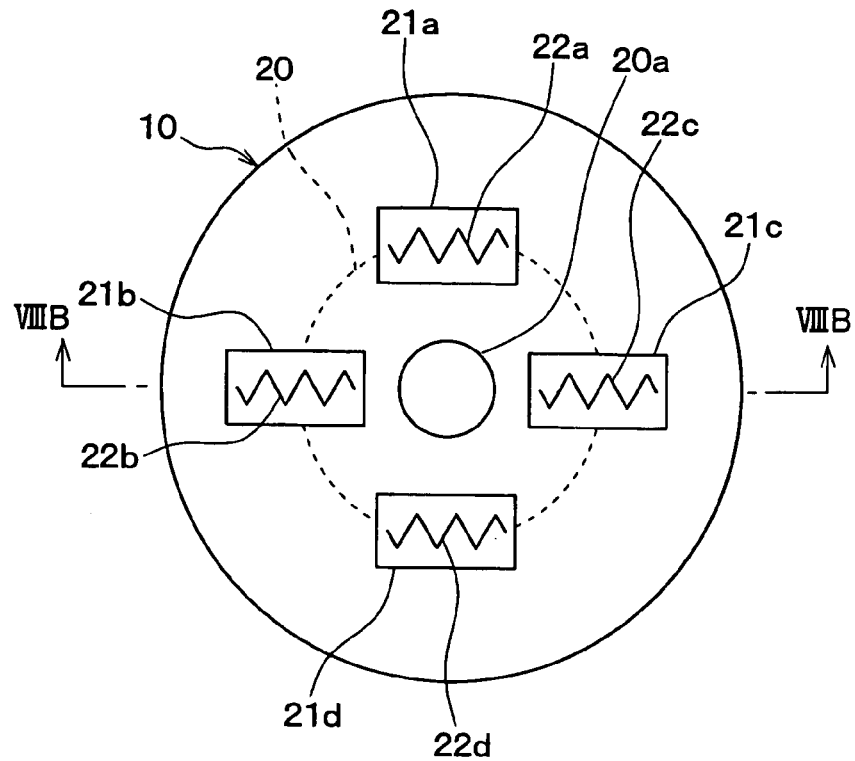
FIG. 8A is a plan view showing a part of a pressure sensor according to a sixth embodiment.

The sixth embodiment will be described. FIG. 8A is an enlarged view of a detection portion in the pressure sensor 100 of this embodiment, while FIG. 8B is a sectional view taken along line VIIIB-VIIIB indicated in FIG. 8A.

Figure 8B:
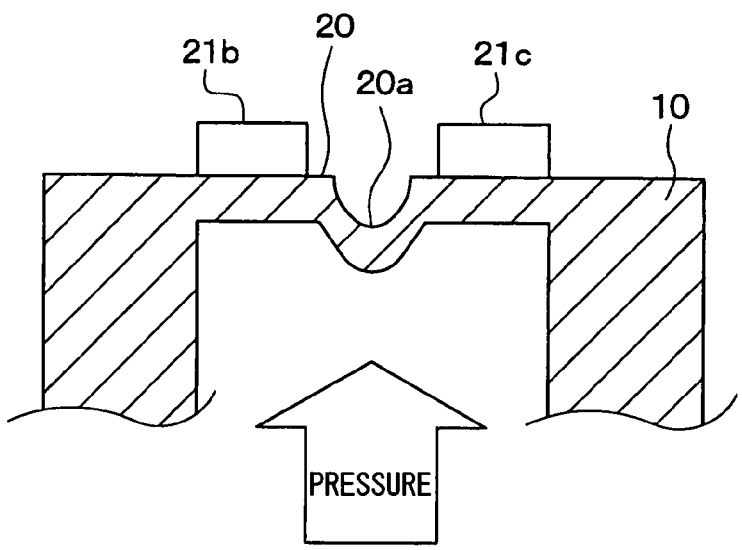
FIG. 8B is a cross sectional view showing the part of the sensor taken along line VIIIB-VIIIB in FIG. 8A.

As shown in FIGS. 8A and 8B, a groove 20a is formed centrally of a diaphragm 20 which is formed in a housing 10. The groove 20a has a size at which this groove does not interfere with semiconductor chips 21a-21d that are formed with respective gauge resistances 22a-22d and that are arranged on the front surface of the diaphragm 20. This embodiment has a structure in which the semiconductor chips 21a-21d are arranged so as to surround the groove 20a. As seen from FIG. 8B, the groove 20a is in such a shape that the diaphragm 20 is depressed from a surface onto which a pressure to-be-measured is applied. The existence of the groove 20a acts so that the displacement magnitude of the diaphragm 20 for an identical pressure may become larger than in a case where this groove 20a does not exist.

In this manner, the displacement magnitude of the diaphragm under the action of the pressure can be enlarged by forming the groove 20a at the central position of the diaphragm 20, and the sensitivity of the pressure sensor 100 can be heightened more.

Seventh Embodiment

Figure 9:
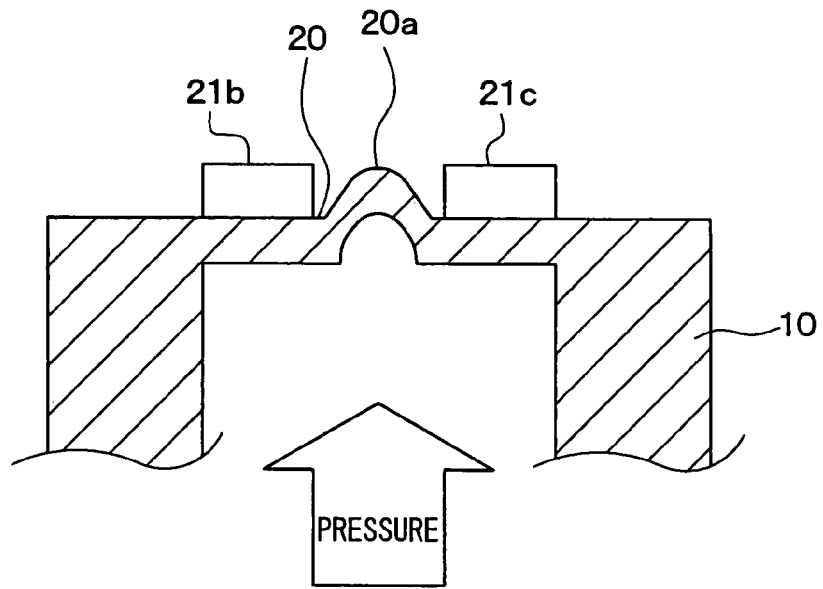
FIG. 9 is a cross sectional view showing a detection part of a pressure sensor according to a seventh embodiment.

The seventh embodiment will be described. FIG. 9 is a sectional view of a detection portion in the pressure sensor 100 of this embodiment.

As shown in FIG. 9, in this embodiment, a groove 20a is formed centrally of a diaphragm 20 formed in a housing 10, in the same manner as in the sixth embodiment. The groove 20a, however, is in such a shape that the diaphragm 20 is protruded onto a side opposite to a surface onto which a pressure to-be-measured is applied. The existence of such a groove 20a acts so that the displacement magnitude of the diaphragm 20 for an identical pressure may become larger than in a case where this groove 20a does not exist.

Even when, in this manner, the groove 20a is formed at the central position of the diaphragm 20 so as to protrude from the opposite surface to the surface onto which the pressure to-be-measured is applied, the sensitivity of the pressure sensor 100 can be heightened more.

Eighth Embodiment

Figure 10:
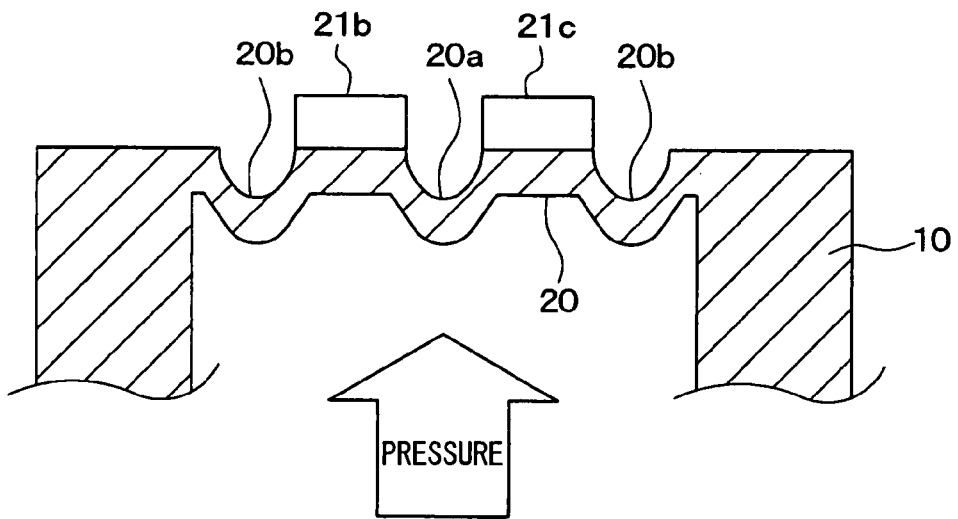
FIG. 10 is a cross sectional view showing a detection part of a pressure sensor according to an eighth embodiment.

The eighth embodiment will be described. FIG. 10 is a sectional view of a detection portion in the pressure sensor 100 of this embodiment.

As shown in FIG. 10, in this embodiment, a groove 20a is formed centrally of a diaphragm 20 formed in a housing 10, in the same manner as in the sixth embodiment. Here, in addition to the groove 20a, an annular groove 20b is formed at the outer edge part of the diaphragm 20 so as to surround all semiconductor chips 21a-21d. Both the grooves 20a and 20b are in such a shape that the diaphragm 20 is depressed from a surface onto which a pressure to-be-measured is applied. When the groove 20b is formed in addition to the groove 20a in this manner, the displacement magnitude of the diaphragm 20 for an identical pressure can be enlarged still more than in the sixth embodiment which is formed with only the groove 20a.

Owing to such a configuration in which the groove 20a is formed at the central position of the diaphragm 20, and besides, the groove 20b is formed at the outer edge part of the diaphragm 20, the sensitivity of the pressure sensor 100 can be heightened more.

Ninth Embodiment

Figure 11:
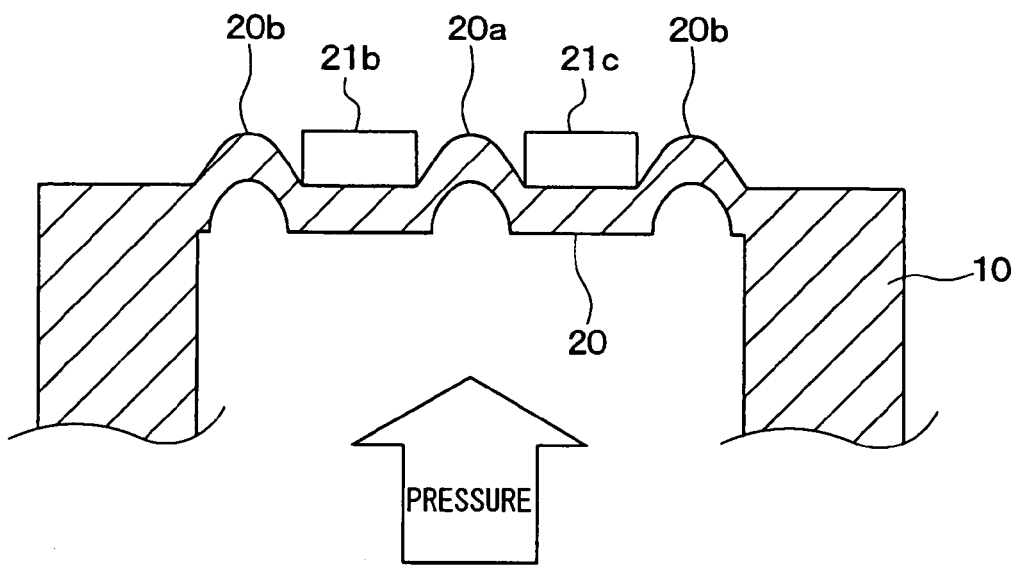
FIG. 11 is a cross sectional view showing a detection part of a pressure sensor according to a ninth embodiment.

The ninth embodiment will be described. FIG. 11 is a sectional view of a detection portion in the pressure sensor 100 of this embodiment.

As shown in FIG. 11, in this embodiment, a groove 20a is formed centrally of a diaphragm 20 formed in a housing 10, and an annular groove 20b is formed at the outer edge part of the diaphragm 20, in the same manner as in the eighth embodiment. The grooves 20a and 20b, however, are formed so as to protrude from an opposite surface to a surface onto which a pressure to-be-measured is applied, in the same manner as in the seventh embodiment.

When, in this manner, the grooves 20a and 20b are respectively formed at the central position and outer edge part of the diaphragm 20 so as to protrude from the opposite surface to the surface onto which the pressure to-be-measured is applied, the sensitivity of the pressure sensor 100 can be heightened more.

Tenth Embodiment

Figure 12:
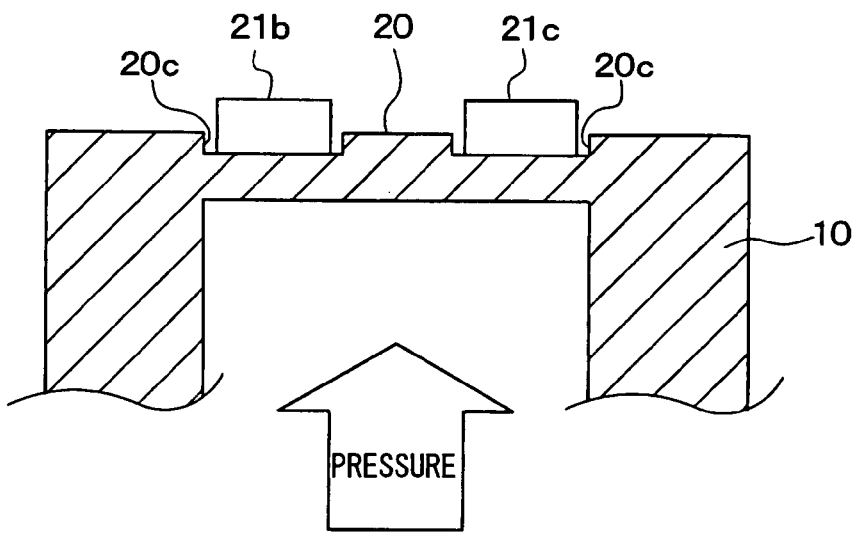
FIG. 12 is a cross sectional view showing a detection part of a pressure sensor according to a tenth embodiment.

The tenth embodiment will be described. FIG. 12 is a sectional view of a detection portion in the pressure sensor 100 of this embodiment.

As shown in FIG. 12, this embodiment has such a structure that an annular groove 20c is provided so as to pass through the arrangement places of semiconductor chips 21a-21d in a diaphragm 20, and that the groove 20c has its bottom flattened so as to hold the semiconductor chips 21a-21d in this groove 20c. Owing to the provision of such a recess being the groove 20c, the diaphragm 20 is partially thinned. As in each of the sixth-ninth embodiments, therefore, the displacement magnitude of the diaphragm 20 for an identical pressure can be enlarged.

In this manner, the sensitivity of the pressure sensor 100 can be heightened more by providing the annular groove 20c in the diaphragm 20. Incidentally, although the structure in which all the semiconductor chips 21a-21d enter the annular groove 20c has been shown here, the semiconductor chips may well be arranged outside the groove 20c.

Eleventh Embodiment

Figure 13:
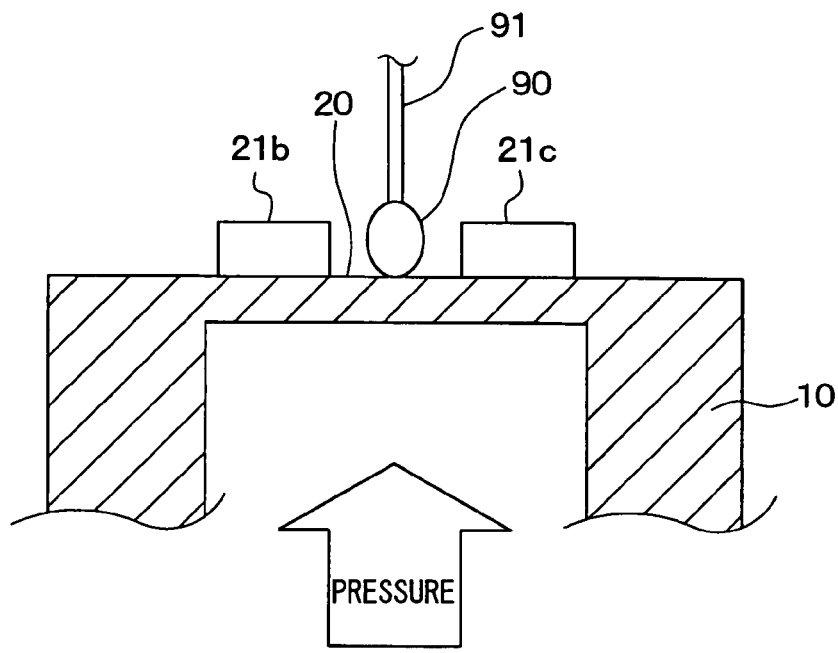
FIG. 13 is a cross sectional view showing a detection part of a pressure sensor according to an eleventh embodiment.

The eleventh embodiment will be described. FIG. 13 is a sectional view of a detection portion in the pressure sensor 100 of this embodiment.

As shown in FIG. 13, this embodiment has a structure in which a sensor element 90 being a separate component is disposed at the central part of a diaphragm 20. The sensor element 90 is arranged in touch with the front surface of the diaphragm 20. The sensor element 90 is constructed of, for example, a temperature sensor (thermistor) or an acceleration sensor. In a case where the sensor element 90 is constructed of the temperature sensor, it can detect the temperature of the diaphragm 20 or the temperature of a medium whose pressure is to be measured through the diaphragm 20. Besides, in a case where the sensor element 90 is constructed of the acceleration sensor, it can detect a pressure pulsation by detecting the displacement acceleration of the diaphragm 20. Such a sensor element 90 is connected to a terminal 91 for external connection, and it can be electrically connected with the exterior through a terminal pin, not shown here, which is disposed for this sensor element likewise to the terminal pin 50 shown in FIG. 1.

In this manner, the sensor element 90 may well be arranged by effectively utilizing a vacant space which is defined at the central part of the diaphragm 20 when semiconductor chips 21a-21d are arranged on this diaphragm.

Incidentally, although the example in which the sensor element 90 is merely held in touch with the front surface of the diaphragm 20 has been mentioned in this embodiment, the sensor element 90 may well be fixed to the front surface of the diaphragm 20 by employing an adhesive.

Besides, although the temperature sensor or the acceleration sensor has been mentioned as the example of the sensor element 90 here, it can be replaced with a position sensor which detects the displacement magnitude of the diaphragm 20 through laser irradiation. In this case, the sensor element 90 is not held in direct touch with the front surface of the diaphragm 20, but it is spaced from the front surface of the diaphragm 20, and the central part of the front surface of the diaphragm 20 is made a reflective surface, whereupon the laser irradiation is carried out so as to detect the displacement magnitude of the diaphragm 20. Thus, the displacement magnitude of the diaphragm 20 can be evaluated, and pressure detections based on the different techniques can be conjointly performed.

Twelfth Embodiment

Figure 14:
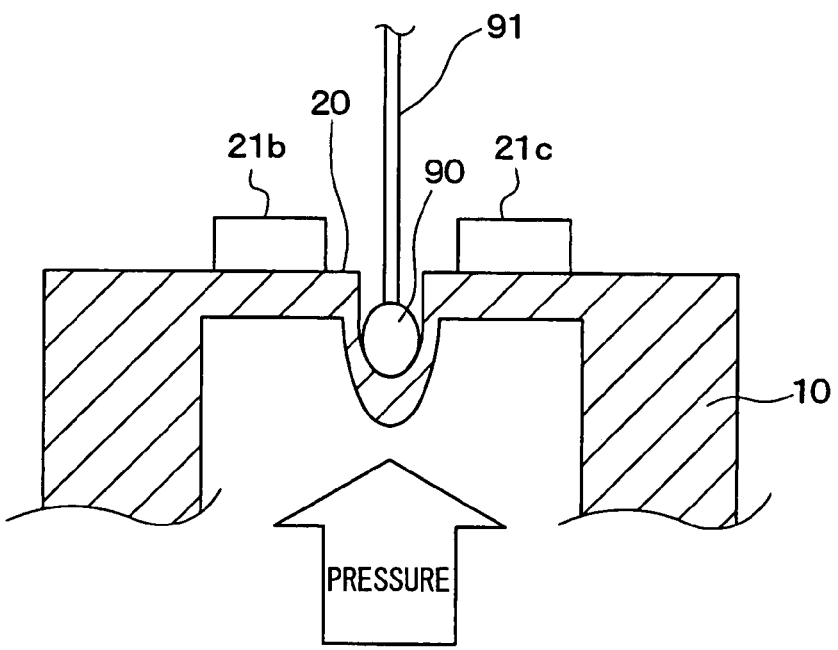
FIG. 14 is a cross sectional view showing a detection part of a pressure sensor according to a twelfth embodiment.

The twelfth embodiment will be described. FIG. 14 is a sectional view of a detection portion in the pressure sensor 100 of this embodiment.

This embodiment consists in combining the groove 20a shown in the sixth embodiment and the sensor element 90 shown in the eleventh embodiment. As shown in FIG. 14, the groove 20a which is depressed onto the side of a pressure introducing port 12 is formed centrally of a diaphragm 20, and the sensor element 90 is disposed so as to enter the groove 20a. In addition, the sensor element 90 lies in touch with the bottom and side surface of the groove 20a.

Owing to such a structure, it is permitted to attain the same advantages as those of the sixth embodiment and to attain the same advantages as those of the eleventh embodiment. Further, in the case where the sensor element 90 is constructed as the temperature sensor, a temperature change is easily transmitted to the sensor element 90 owing to the entry thereof in the groove 20a, and responsiveness to the temperature change can be enhanced.

FIGS. 15A and 15B are sectional views showing situations at the time when the pressure sensor 100 of this embodiment is assembled, and FIG. 15A shows the situation before the assemblage, while FIG. 15B shows the situation after the assemblage.

As shown in these figures, the terminal 91 of the sensor element 90 can be electrically connected with the exterior through a terminal pin 51 which is disposed for this sensor element. Besides, a bottomed circularly-arcuate stem 92 which is a member separate from a housing 10 is prepared, and the bottom of the stem 92 is used as the diaphragm 20. With such a structure, the stem 92 is fixed to the housing 10, and the stem 92 as well as the housing 10 is thereafter fixed to a connector case 60. Therefore, the pressure sensor 100 having the structure of this embodiment can be easily realized in such a way that the terminal 91 of the sensor element 90 is connected to the terminal pin 51 beforehand, and that, when the stem 92 as well as the housing 10 are fixed to the connector case 60, they are simultaneously assembled so as to put the sensor element 90 into the groove 20a of the diaphragm 20.

Other Embodiments

In the first and the third-fifth embodiments, the arrangements of the semiconductor chips 21a-21g have been set as shown in FIG. 2-FIG. 7, but they are mere examples. The strain gauges 22a-22d are so mounted on the diaphragm 20 that two of them undergo compressive stresses, while the remaining two undergo tensile stresses. The semiconductor chips 21a-21g may be arranged in any places as long as such stresses are applied in the places.

Besides, the second embodiment has been described concerning the example in which only one of the strain gauges 22a-22d is formed on the diaphragm 20. Alternatively, only two or only three of the strain gauges 22a-22d may well be formed on the diaphragm 20.

Figure 16:
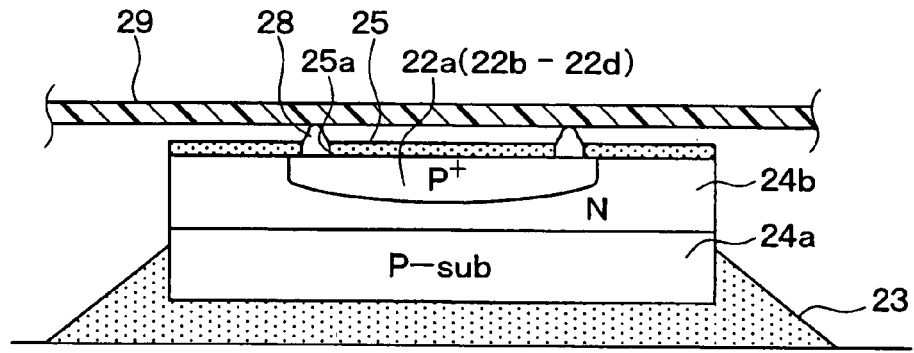
FIG. 16 is a partially enlarged cross sectional view showing a pressure sensor according to another embodiment.
Figure 17:
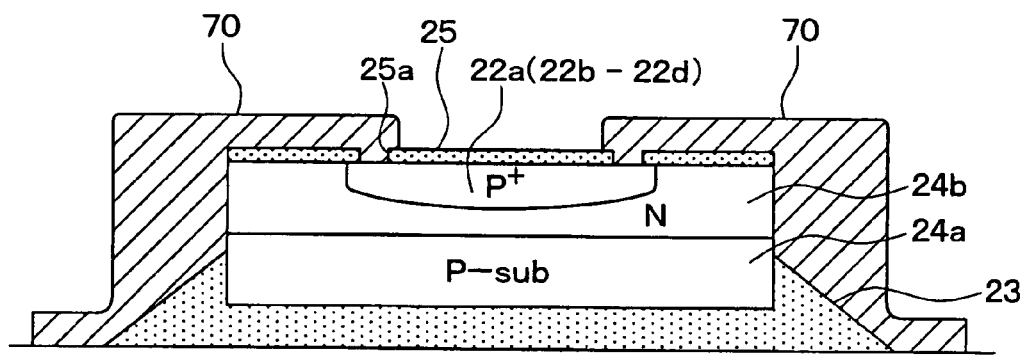
FIG. 17 is a partially enlarged cross sectional view showing a pressure sensor according to further another embodiment.

Further, the embodiments have been in the aspects in which the electrical connections with the semiconductor chips 21a-21g and the substrate 30 are performed through the bonding wires 27 and 32, but different aspects may well be employed. FIGS. 16 and 17 are partial enlarged views of pressure sensors showing examples of the different aspects, and they correspond to the portion shown in FIG. 2A.

As shown in FIG. 16, bumps 28 of solder or the like are formed in contact holes 25a for electrical connections with strain gauges 22a-22d, and a flexible circuit board 29 which is formed with wiring patterns to be electrically connected with the bumps 28 is mounted on the bumps 28 so as to be joined with the bumps 28. In addition, although no illustration is made, the flexible circuit board 29 is electrically connected with the substrate 30 through bonding wires or bumps. In this manner, the electrical connections with the semiconductor chips 21a-21g and the substrate 30 can be performed by flip-chip mounting in which the bumps 28 are employed instead of the bonding wires 27.

Likewise, as shown in FIG. 17, the electrical connections with the semiconductor chips 21a-21g and the substrate 30 can be performed in such a way that, after the semiconductor chips 21a-21g have been joined to the diaphragm 20, aluminum evaporation or the like is carried out, thereby to lay aluminum wires 70 as are formed on the flexible circuit board 29. Incidentally, although no illustration is made in FIG. 17, such processing as covering the side surfaces of the silicon substrates 24a and the N-type epitaxial layers 24b with insulating films is performed in the case of carrying out the aluminum evaporation, in order to electrically isolate the aluminum wires 70 from the side surfaces of the silicon substrates 24a and the N-type epitaxial layers 24b.

Further, many of the embodiments have been described by mentioning the examples in which, as shown in FIG. 1, the diaphragm 20 is formed unitarily with the housing 10, but the embodiments are also applicable to an aspect in which the diaphragm 20 is separate from the housing 10 in such a manner that only a pressure introducing port 13 is formed in the housing 10 beforehand and that a stem formed with the diaphragm 20 is arranged in the pressure introducing port 13.

Besides, the second embodiment has been described by exemplifying the case where only one of the four strain gauges 22a-22d is formed on the semiconductor chip 21a, but two of them can also be formed. FIGS. 18A and 18B are model diagrams each showing the schematic configuration of the whole pressure sensor in that case.

As shown in FIG. 18A, the strain gauge 22a is formed on the semiconductor chip 21a, while the strain gauge 22d is formed on the semiconductor chip 21d, and the remaining two strain gauges 22b and 22c are formed within the substrate 30 which is formed with the signal processing circuit. Besides, as shown in FIG. 18B, the strain gauges 22a and 22d are formed on a semiconductor chip 21h, and the remaining two strain gauges 22b and 22c are formed within a substrate 30 which is formed with a signal processing circuit. Such a configuration may well be employed.

Figure 19:
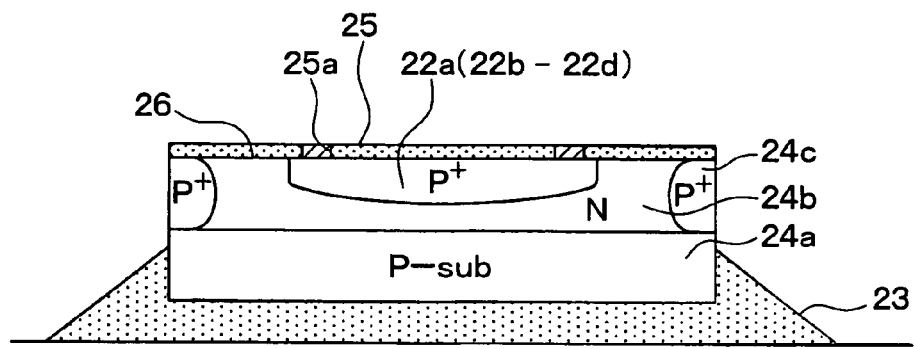
FIG. 19 is a cross sectional view showing a semiconductor chip in a pressure sensor according to another embodiment.

Further, the embodiments have shown only the configuration in which, as shown in FIG. 2A, the N-type epitaxial layer 24b is formed on the front surface of the silicon substrate 24a of the P-type. However, as shown in the sectional view of FIG. 19 by way of example, a $P^+$-type layer 24c may well be formed so as to surround the corresponding one of the strain gauges 22a-22d within the N-type epitaxial layer 24b, thereby to perform element isolation.

Figure 20:
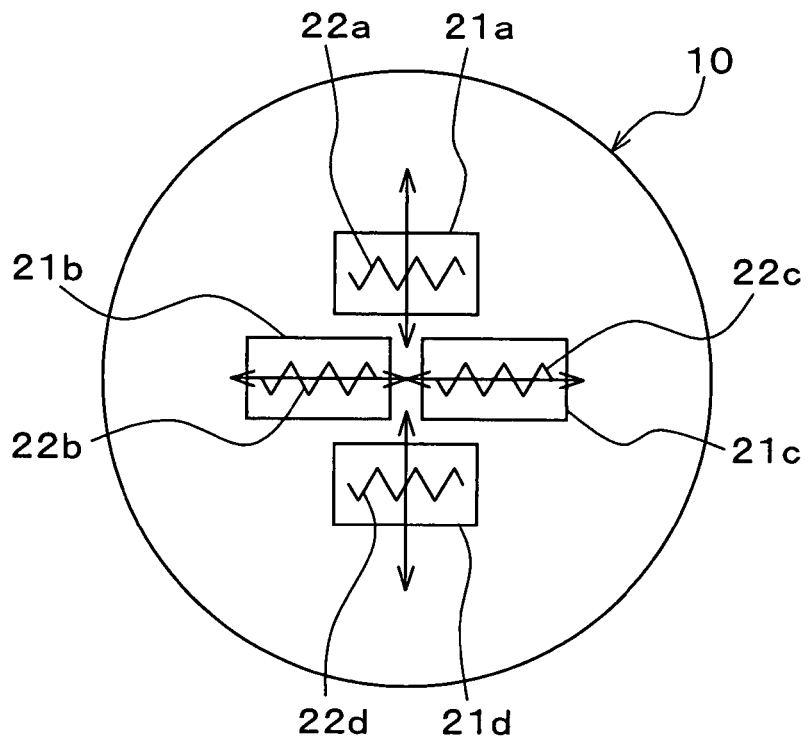
FIG. 20 is a plan view showing a part of a pressure sensor according to another embodiment.

FIG. 20 shows a part of a pressure sensor according to another embodiment. In this case, one strain gauge 22a-22d is disposed in one chip 21a-21d, so that a relative position of the gauge 22a-22d is changeable without changing a metallic stem. Thus, sensitivity of the gauge is preferably controlled.

Figure 21:
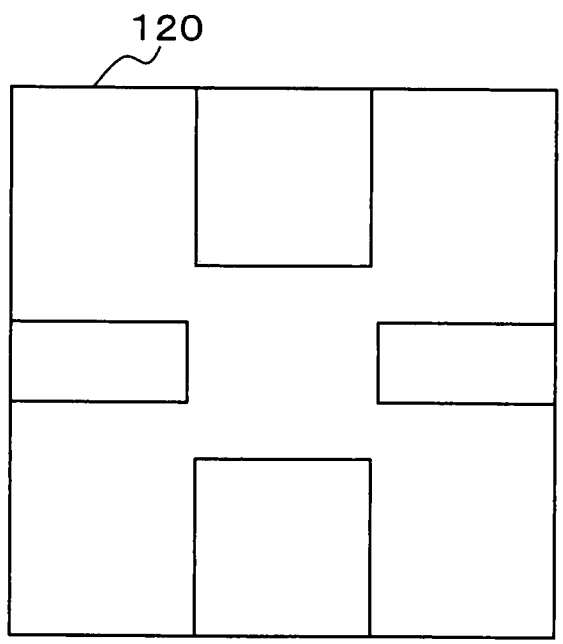
FIG. 21 is a schematic plan view showing a jig for assembling a pressure sensor according to another embodiment.

FIG. 21 shows a shape of a jig for assembling a pressure sensor according to another embodiment. When a semiconductor chip is attached to a metallic stem, four chips are set on a jig shown in FIG. 21. At the same time, four chips are mounted on the metallic stem, so that positioning accuracy between the chips and the metallic stem is obtained.

Figure 22:
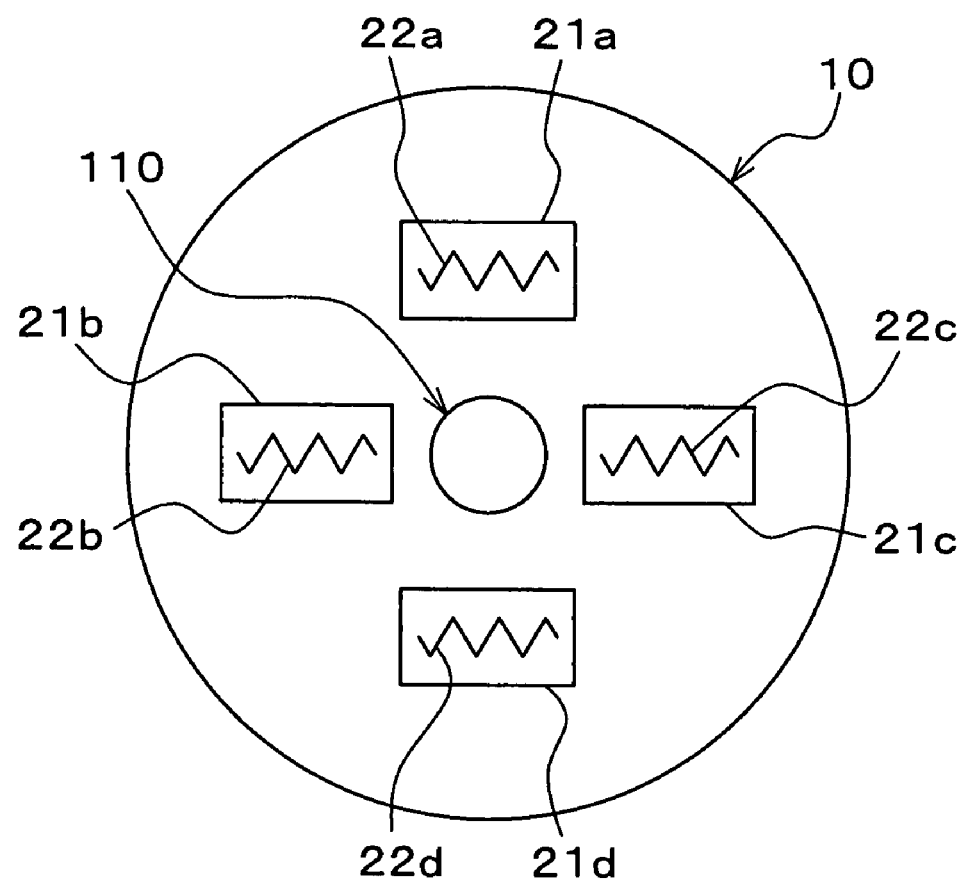
FIG. 22 is a plan view showing a part of a pressure sensor according to another embodiment.

FIG. 22 shows a part of a pressure sensor according to another embodiment. Since one gauge 22a-22d is mounted on one chip 21a-21d, another member 110 can be mounted at a center portion.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A pressure sensor for detecting pressure comprising:
a metallic diaphragm for receiving the pressure;
four strain gauges providing a Wheatstone bridge, wherein each strain gauge outputs an electric signal corresponding to deformation of the diaphragm when the diaphragm is deformed by the pressure; and
four semiconductor chips corresponding to four strain gauges, wherein each strain gauge is disposed in the semiconductor chip, wherein,
each semiconductor chip is mounted on the diaphragm.

2. The sensor according to claim 1, further comprising:
a bonding wire for coupling among the four strain gauges to provide the Wheatstone bridge.

3. The sensor according to claim 1, further comprising:
a bump for electrically coupling among the four strain gauges; and
a board having a wiring pattern, which corresponds to the bump, wherein
the four strain gauges are coupled with each other through the bump and the wiring pattern so that the four strain gauges provide the Wheatstone bridge.

4. The sensor according to claim 1, further comprising:
an aluminum wire disposed on both of the four semiconductor chips and the diaphragm, wherein
the four strain gauges are electrically coupled with each other through the aluminum wire so that the four strain gauges provide the Wheatstone bridge.

5. The sensor according to claim 1, wherein
each semiconductor chip has planar dimensions of a width in a range between 0.3 mm and 2.0 mm and a length in a range between 0.3 mm and 2.0 mm.

6. The sensor according to claim 1, wherein
the diaphragm includes a groove, which is disposed at a center portion of the diaphragm.

7. The sensor according to claim 6, wherein
the diaphragm has a pressure receiving surface for receiving the pressure, and
the groove protrudes from the pressure receiving surface.

8. The sensor according to claim 6, wherein
the diaphragm has a pressure receiving surface for receiving the pressure, and
the groove protrudes from a surface of the diaphragm opposite to the pressure receiving surface.

9. The sensor according to claim 1, wherein
the diaphragm includes a groove having a ring shape, which is disposed on a periphery portion of the diaphragm so that the groove surrounds the diaphragm.

10. The sensor according to claim 9, wherein
the diaphragm has a pressure receiving surface for receiving the pressure, and
the groove protrudes from the pressure receiving surface.

11. The sensor according to claim 9, wherein
the diaphragm has a pressure receiving surface for receiving the pressure, And
the groove protrudes from a surface of the diaphragm opposite to the pressure receiving surface.

12. The sensor according to claim 9, wherein
each semiconductor chip is disposed on an inside of the groove.

13. The sensor according to claim 1, further comprising:
a sensor element disposed at a center portion of the diaphragm, wherein
the sensor element is independently disposed from the four strain gauges.

14. The sensor according to claim 13, wherein
the sensor element contacts the center portion of the diaphragm.

15. The sensor according to claim 14, wherein
the sensor element is a temperature sensor for detecting a temperature of the diaphragm, or an acceleration sensor for detecting an acceleration of the diaphragm.

16. The sensor according to claim 13, wherein
the sensor element is separated from the center portion of the diaphragm,
the center portion of the diaphragm provides a mirror surface, and
the sensor element is a position sensor for detecting a displacement of the center portion of the diaphragm in such a manner that the sensor element emits a laser beam to the center portion.

17. The sensor according to claim 13, wherein
the diaphragm includes a groove, which is disposed at a center portion of the diaphragm,
the diaphragm has a pressure receiving surface for receiving the pressure,
the groove protrudes from the pressure receiving surface, and
the sensor element is disposed in the groove.

18. The sensor according to claim 1, wherein
each semiconductor chip is displaceable so that a relative position relationship among the four strain gauges is adjusted so as to control a sensitivity of the sensor.

19. The sensor according to claim 1, wherein
each semiconductor chip is mounted on the diaphragm in such a manner that a center portion of the diaphragm has a space for accommodating an additional member.

20. A method for manufacturing a pressure sensor according to claim 1, the method comprising:
arranging each semiconductor chip on a periphery portion of the diaphragm, which has a disk shape;
adjusting a sensor sensitivity of each semiconductor chip by sliding the semiconductor chip along with a radial direction of the diaphragm; and
bonding each semiconductor chip on the diaphragm after the adjusting.

21. The method according to claim 20, wherein
the arranging includes setting and mounting the four semiconductor chips on an integrated jig for increasing a positioning accuracy.

22. A pressure sensor for detecting pressure comprising:
a metallic diaphragm for receiving the pressure;
four strain gauges providing a Wheatstone bridge, wherein each strain gauge outputs an electric signal corresponding to deformation of the diaphragm when the diaphragm is deformed by the pressure;
a first semiconductor chip, wherein two of the four strain gauges are disposed in the first semiconductor chip; and
a second semiconductor chip, wherein other two of the four strain gauges are disposed in the second semiconductor chip, wherein
the first and second semiconductor chips are mounted on the diaphragm.

23. A pressure sensor for detecting pressure comprising:
a metallic diaphragm for receiving the pressure;
four strain gauges providing a Wheatstone bridge, wherein each strain gauge outputs an electric signal corresponding to deformation of the diaphragm when the diaphragm is deformed by the pressure;
a first semiconductor chip, wherein one of the four strain gauges is disposed in the first semiconductor chip; and
a second semiconductor chip, wherein other three of the four strain gauges are disposed in the second semiconductor chip, wherein
the first and second semiconductor chips are mounted on the diaphragm.

24. A pressure sensor for detecting pressure comprising:
a metallic diaphragm for receiving the pressure;
four strain gauges providing a Wheatstone bridge, wherein each strain gauge outputs an electric signal corresponding to deformation of the diaphragm when the diaphragm is deformed by the pressure;
a first semiconductor chip, wherein two of the four strain gauges is disposed in the first semiconductor chip;
a second semiconductor chip, wherein another one of the four strain gauges is disposed in the second semiconductor chip; and
a third semiconductor chip, wherein a last one of the four strain gauges is disposed in the third semiconductor chip, wherein
the first to third semiconductor chips are mounted on the diaphragm.

* * * * *